(12) United States Patent
Puri et al.

(10) Patent No.: US 10,365,931 B2
(45) Date of Patent: Jul. 30, 2019

(54) REMOTE ADMINISTRATION OF INITIAL COMPUTER OPERATING SYSTEM SETUP OPTIONS

(71) Applicant: Microsoft Technology Licensing, LLC, Redmond, WA (US)

(72) Inventors: Namrata Shankar Puri, Redmond, WA (US); Anna Barhudarian, Kirkland, WA (US); Siddharth Mantri, Kirkland, WA (US); Hakki Tunc Bostanci, Redmond, WA (US); Marc Shepard, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 15/444,251

(22) Filed: Feb. 27, 2017

(65) Prior Publication Data
US 2018/0246732 A1    Aug. 30, 2018

(51) Int. Cl.
*G06F 21/00*    (2013.01)
*G06F 9/4401*    (2018.01)
(Continued)

(52) U.S. Cl.
CPC ............ *G06F 9/4416* (2013.01); *G06F 3/065* (2013.01); *G06F 3/067* (2013.01); *G06F 3/0619* (2013.01);
(Continued)

(58) Field of Classification Search
None
See application file for complete search history.

(56) References Cited

U.S. PATENT DOCUMENTS 7,996,832 B2 *  8/2011  Lesher .................... G06F 8/61
                                                    717/177
8,468,139 B1    6/2013  O'Connor et al.
(Continued)

FOREIGN PATENT DOCUMENTS

EP    1426865 A2    6/2004

OTHER PUBLICATIONS

"Apple Device Enrollment Program—streamlined setup for users", https://www.jamf.com/solutions/technologies/device-enrollment-program/, Retrieved on: Nov. 28, 2016, 3 pages.
(Continued)

*Primary Examiner* — Andrew J Steinle
(74) *Attorney, Agent, or Firm* — The Watson I.P. Group, PLC; Vladan M. Vasiljevic

(57) ABSTRACT

Remote administration of initial computer operating system setup options is facilitated by systems and mechanisms that provide such initial setup options to a computing device during an earlier stage of the operating system setup. An administrator defines, in a profile, how such initial setup options are to be set and when an operating system is being set up it communicates with licensing servers to validate the copy of the operating system. If authorized, and if set up by an administrator, initial setup options are provided to the computing device at such an early stage of the operating system setup. Processes executing on the computing device then utilize software licensing application program interfaces to not only validate the copy of the operating system, but also to set the initial setup options in the manner pre-specified by the administrator. A customized directory service login user interface is one such initial setup option.

20 Claims, 5 Drawing Sheets

(51) Int. Cl.
  *G06F 9/54* (2006.01)
  *G06F 3/06* (2006.01)
  *H04L 9/32* (2006.01)
  *H04L 29/06* (2006.01)
  *H04L 12/24* (2006.01)
  *G06F 9/445* (2018.01)
  *G06F 21/12* (2013.01)

(52) U.S. Cl.
  CPC ............ *G06F 9/44505* (2013.01); *G06F 9/54* (2013.01); *G06F 21/126* (2013.01); *H04L 9/3234* (2013.01); *H04L 9/3242* (2013.01); *H04L 41/0806* (2013.01); *H04L 63/0823* (2013.01); *H04L 63/0876* (2013.01); *H04L 41/28* (2013.01)

(56) References Cited

U.S. PATENT DOCUMENTS

| | | | |
|---|---|---|---|
| 2006/0190575 A1* | 8/2006 | Harvey | H04L 67/303 709/222 |
| 2014/0122674 A1 | 5/2014 | Gray et al. | |
| 2014/0359127 A1* | 12/2014 | Linares | H04L 41/0816 709/226 |
| 2015/0263891 A1 | 9/2015 | Baugher et al. | |
| 2016/0112410 A1* | 4/2016 | Nedeltchev | H04L 63/0823 713/156 |
| 2016/0249186 A1 | 8/2016 | Dumov et al. | |

OTHER PUBLICATIONS

"Zero-touch OS deployment using WDS", In White Paper of RES, Jan. 12, 2015, pp. 1-14.

"Apple Deployment Programs", http://images.apple.com/business/docs/DEP_Guide.pdf, Published on: Oct. 2016, 4 pages.

Kuntze, et al., "Demo: Zero Touch Configuration", In Proceedings of IFIP/IEEE International Symposium on Integrated Network Management, May 31, 2013, pp. 1076-1077.

"IOS Deployment Overview for Business", http://images.apple.com/business/docs/IOS_Deployment_Overview_Business.pdf, Published on: Oct. 2016, 11 pages.

Monica, et al., "Deploying Windows 10", http://www.overneteducation.it/v2beta/UserFiles/file/ebook/ Microsoft_Press_ebook_Deploying_Windows_10_PDF.p, Retrieved on: Nov. 28, 2016, 95 pages.

"International Search Report and Written Opinion Issued in PCT Application No. PCT/US2018/018652", dated Apr. 20, 2018, 13 pages.

* cited by examiner

REMOTE ADMINISTRATION OF INITIAL COMPUTER OPERATING SYSTEM SETUP OPTIONS

BACKGROUND

While computer users may desire to set up the operating systems of their personal computers in a heterogeneous manner, substantial benefits can be realized by entities having multiple employees when the operating systems of the computing devices utilized by such employees are set up in a homogeneous manner. For example, remote administration, support and troubleshooting such computing devices can be made much simpler, more efficient and less expensive if the computing devices are homogenous insofar as their operating system settings and the applications installed thereon. Traditionally, the marginality of such computing devices is maintained through the use of directory services, wherein a computing device utilized by an employee of such an entity provides credentials to a directory service and, based upon such credentials, the computing device receives appropriate settings and applications, such as can have been established in advance and in a homogeneous manner by an information technology (IT) administrator of such an entity.

Unfortunately, before a new, or erased, computing device can meaningfully communicate with such a directory service, initial operating system setup options may need to be established. For example, the operating system may require a user to accept an end-user license agreement before the computing device can be utilized in any meaningful manner including, for example, establishing the aforementioned communication with a directory service. As another example, the operating system may require a user to set various network settings, personal assistant settings, or other like initial operating system setup options before the operating system can facilitate the computing devices communication with the directory service. Such initial operating system setup options are, then, typically selected by the individual employees of the entity, and may not be selected in a homogenous manner. To avoid such a situation, IT administrators are typically forced into a time-consuming process of having to reinstall an operating system from scratch in order to ensure that the initial setup options are set in a homogenous manner for each computing device associated with the entity.

SUMMARY

The remote administration of initial computer operating system setup options, such as those that are set prior to a user of the computing device being allowed to communicationally couple the computing device with a directory service, can be facilitated by systems and mechanisms that provide such initial setup options to a computing device during an earlier stage of the operating system setup. Identifiers of both the hardware of the computing device and the copy of the operating system being installed on the computing device can be utilized to identify the computing device and claim ownership of it for purposes of defining how such initial setup options are to be set. An administrator can then define how such initial setup options are to be set in a profile that can be associated with multiple computing devices. When an operating system is being set up on one of those computing devices, such an operating system can utilize network capabilities of the computing device to communicate with a licensing server in order to validate the copy of the operating system being set up. If authorized, and if set up by an administrator, initial setup options can be provided to the computing device at such an early stage of the operating system setup. Processes executing on the computing device can then utilize software licensing application program interfaces to not only validate the copy of the operating system, at such an early stage of the operating system setup, but can also use those same software licensing application program interfaces to set the initial setup options in the manner pre-specified by the administrator. As part of the initial setup options, a customized directory service login user interface can be presented by which a user of the computing device can log in to the directory service and obtained therefrom additional operating system setup options, as well as other applications to be installed on the computing device. In such a manner, administrators can provide homogenous setups of multiple computing devices, facilitating their support and maintenance thereof.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
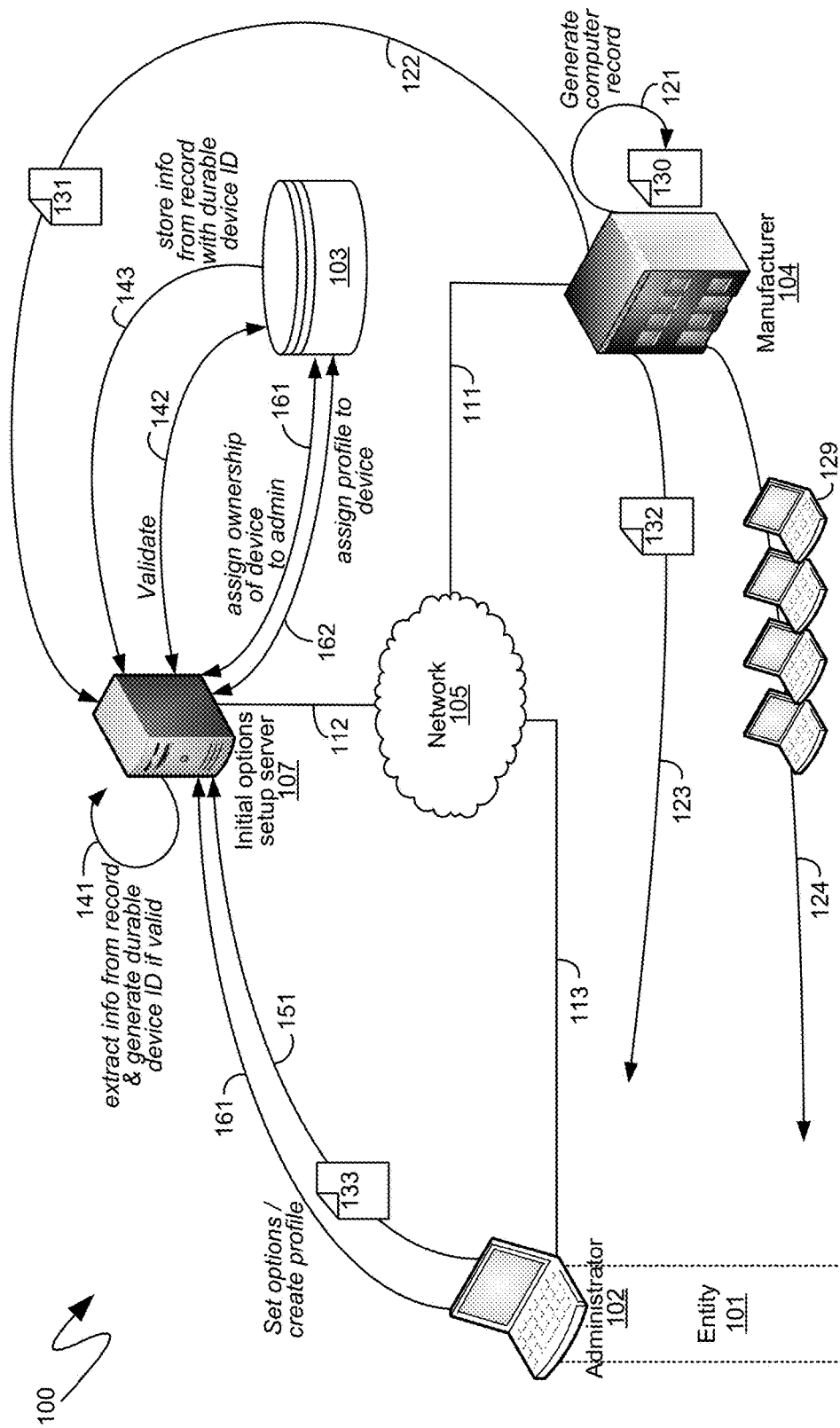
FIG. 1 is a system diagram of an exemplary system for assigning and providing initial install options to a computing device.

The following description relates to the remote administration of initial computer operating system setup options, such as those that are set prior to a user of the computing device being allowed to communicationally couple the computing device with a directory service. The coupling of the computing device with the directory service, and the user's login therethrough are the traditional mechanisms by which operating system setup options and other applications are set and installed on the computing device. However, the initial computer operating system setup options have already been set by the time that the user of the computing device logs into the directory service and, as such, have been beyond the control of a centralized or remote administrator, and, instead, have typically been set by individual users themselves.

Remote administration of such initial computer operating system setup options can be facilitated by systems and mechanisms that provide such initial setup options to a computing device during an earlier stage of the operating system setup. Identifiers of both the hardware of the computing device and the copy of the operating system being installed on the computing device can be utilized to identify the computing device and claim ownership of it for purposes of defining how such initial setup options are to be set. An administrator can then define how such initial setup options are to be set in a profile that can be associated with multiple computing devices. When an operating system is being set up on one of those computing devices, such an operating system can utilize network capabilities of the computing device to communicate with a licensing server in order to validate the copy of the operating system being set up. If authorized, and if set up by an administrator, initial setup options can be provided to the computing device at such an early stage of the operating system setup. Processes executing on the computing device can then utilize software licensing application program interfaces to not only validate the copy of the operating system, at such an early stage of the operating system setup, but can also use those same software licensing application program interfaces to set the initial setup options in the manner pre-specified by the administrator. As part of the initial setup options, a customized directory service login user interface can be presented by which a user of the computing device can log in to the directory service and obtained therefrom additional operating system setup options, as well as other applications to be installed on the computing device. In such a manner, administrators can provide homogenous setups of multiple computing devices, facilitating their support and maintenance thereof.

The techniques described herein make reference to "initial setup options", as distinguished from "subsequent setup options". As will be recognized by those skilled in the art, mechanisms already exist by which various options of an operating system can be automatically set in accordance with criteria established by, for example, a centralized administrator. Such mechanisms rely on directory services to which a user logs in and the options that are set are then set based on the specific user, as identified by the user's login information. Consequently, such existing mechanisms cannot set those options that an operating system requests a user to set before allowing the user to log on to the directory service in the first place. For purposes of the descriptions provided herein, the term "initial setup options" means those operating system options that the operating system requests a user to set prior to allowing the user to log on to a directory service. Similarly, for purposes of the descriptions provided herein, the term "subsequent setup options" means those operating system options that are set in accordance with user specific settings provided based on the user's login to the directory service.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. While the exemplary system 100 of FIG. 1 commences with the manufacturing of computing devices, such as the exemplary computing device 129, by a computing device manufacturer 104, the descriptions provided below are equally applicable to computing devices that have been reformatted, erased, or otherwise restored to a condition analogous or equivalent to that of when they were first manufactured. As illustrated in FIG. 1, the system exemplary system 100 shown therein can comprise a manufacturer of computing devices, such as the exemplary manufacturer 104. The exemplary manufacturer 104 and manufacture computing devices, such as exemplary computing device 129, that can be provided to an entity, such as the exemplary entity 101, as illustrated by the arrow 124.

As part of the manufacturing of such computing devices, an exemplary manufacturer 104 can generate a record of each device that can comprise identifying information of each manufactured computing device. For example, such a record can comprise a serial number assigned to the fractured computing device. As another example, such a record can comprise a product key identifier, or other like identifier that can uniquely identify a particular copy of software installed on such a computing device, such as the operating system, or other application programs. As yet another example, such a record can comprise identifying information of various hardware components of a manufactured computing device. Such hardware components can include Trusted Platform Modules (TPM), networking hardware, such as a wired network interface card, or a wireless network interface card, one or more storage media, such as in the form of magnetic or solid state-based hard disk drives, memory that can comprise a Basic Input Output System (BIOS), and other like hardware components. Each of such components can include various forms of identifying information. For example, a TPM can have stored thereon an Endorsement Key (EK) certificate that is unique to a particular TPM. As another example, network interface cards can have associated with them Media Access Control (MAC) addresses that are unique to those interface cards. A hard disk drive can, itself, have a serial number associated with it, and the BIOS can have associated with it a SMBIOS ID, or other like identifier. The computer record of a computing device generated by, for example, the manufacturer 104, can comprise one or more such identifiers of hardware components of that computing device.

According to one aspect, the computer record can further comprise a hash of one or more such identifiers of hardware components. As will be recognized by those skilled in the art, a computing device can be "measured", in the terminology of those skilled in the art, through the generation of such hashes of values associated with one or more hardware components of a computing device. One known "measurement" of a computing device, utilizable item mechanisms described herein, is the so-called "4 k hardware hash".

The computer record described above can be in the form of a standardized Computer Build Record (CBR), in the information contained therein can be entered manually, or it can be automatically obtained from a computing device, either during manufacture of such a computing device or a subsequent time. More specifically, such information can be automatically obtained through various software interfaces exposed by the various hardware components and their corresponding control systems. Thus, such information can be obtained by the manufacturer 104, or can be obtained by another entity at any time during the useful life of the computing devices. For purposes of illustration, however, the exemplary system 100 of FIG. 1 shows such a computer record, in the form of the exemplary computer record 130, being generated by the manufacturer 104, as illustrated by the arrow 121.

According to one aspect, the computer record 130 can be provided to an entity purchasing the computing devices, such as exemplary entity 101. As will be detailed below information from the computer build record 130 can facilitate the setting of initial setup options of the operating systems of the computing devices manufactured by the manufacturer 104. Consequently, according to one aspect, such a computer record can be provided to an administrator whose role it is to administer the computing devices purchased by, and utilized by the entity 101. Such an administrator can utilize an administrator computing device, such as exemplary administrator computing device 102, illustrated in the exemplary system 100 of FIG. 1. The arrow 123 signifies such a communication of the computer record 130 to the administrator computing device 102. The computer record provided is numbered as computer record 132 in FIG. 1 to show that it is a separate, but otherwise equivalent, or even identical, copy from the originally generated computer record 130.

Another copy of the computer record 130, in the form of the exemplary copy 131, can be provided to mechanisms that can facilitate the remote administration of initial operating system setup options, such as the exemplary initial options setup server 107. Although illustrated as a single computing device, the initial options setup server 107 is meant to be representative of one or more server computing devices acting in concert. Consequently, the actions described below and attributed to the initial options setup server 107, maybe performed by a single server computing device, multiple server computing devices acting in concert, or one or more groups of server computing devices having defined sub-roles of the mechanisms detailed herein. As illustrated exemplary system 100 of FIG. 1, a copy of the computer record 130, in the form of the copy 131, can be provided to such an initial options setup server 107, such as by the manufacturer 104, as illustrated by the arrow 122. The copies of the record 131 and 132 can be communicated to the administrative computing device 102 and the initial options setup server 107 through network communications, with each of the administrator computing device 102, the initial options setup server 107, and the manufacturer 104 all being communicationally coupled to one another via the network 105, with the communicational couplings being illustrated as communicational couplings 113, 112 and 111, respectively.

Upon receipt of the computer record 131, various collections of information can be extracted from the record and associated with one another, such as in the database 103 to which the initial options setup server 107 can be communicationally coupled. For example, the initial options setup server 107 can extract the hardware hash, or other like measurement of the hardware of a computing device identified by the record 131. As another example, the initial options setup server 107 can extract the product key or other like identifier of the copy of the operating system installed on the computing device identified by the record 131. Such extracted values can then be associated with one another within the exemplary database 103.

According to one aspect, a durable device identifier can be generated on the information obtained from the record 131. As utilized herein, the term "durable device identifier" means an identifier of a computing device that can continue to uniquely identify such a computing device even when one or more, or multiple, hardware or software components of such a computing device are changed, upgraded, or otherwise replaced. The generation of such a durable device identifier can be performed by the initial options setup server 107, or can be performed by a service executing separately from the service receiving the computer record 131 and extracting the other information, identified above, therefrom. Once generated, such a durable device identifier can itself be associated with the other information extracted from the record 131, in the exemplary database 103. In such a manner, multiple mechanisms by which a computing device can be uniquely identified can be utilized for purposes of remotely administering initial operating system setup options.

Within the exemplary system 100 shown in FIG. 1, the extraction of information from the record 131, such as by the initial options setup server 107, is illustrated by the arrow 141, which also is meant to represent the generation of a durable device identifier. According to one aspect, the generation of a durable device identifier can be performed only if a validation, such as is illustrated by the exemplary arrow 142, validates at least some of the information from the record 131. For example, such a validation can confirm that the product key identifier provided for the operating system identifies a valid, authorized, and properly purchased copy of such operating system. Such a validation can be made with reference to information stored in the database 103, or can be made with reference to other databases, such as databases maintained by the operating system manufacturer, or combinations thereof. In such an aspect, if the record 131 is determined to be valid, processing can proceed to generate the aforedescribed durable device identifier.

According to one aspect, in addition to validating a copy of the operating system itself, a further validation can be performed to determine whether the functionality of remotely administering initial operating system setup options has been activated. For example, such functionality can be a premium product that can be activated independently of the operating system itself. In such an instance, a further validation can determine whether the copy of the operating system installed on the computing device corresponding to the record 131 is properly authorized to perform the automated setting of initial setup options in accordance with options preselected by remote administrator. Should such a further validation be performed, according to one aspect, the generation of a durable device identifier can proceed only if both the validation of the validity of the copy of the operating system, and the further validation that the functionality described herein has been properly authorized, are successful.

As indicated previously, various information from the computer record, such as exemplary record 131, can be extracted and stored in a manner that it is associated with one another, such as an exemplary database 103. The storage of such information in such a format is illustrated in the exemplary system 100 of FIG. 1 by the arrow 143.

Subsequently, an administrator, such as an administrator utilizing the administrator computing device 102, can utilize information from the computer record 132 received by such an administrator in order to claim ownership of the manufactured computing devices for purposes of remotely administering the automated setting of initial setup options on such computing devices. According to one aspect, the administrator can provide the computer record received by such an administrator to the initial options setup server 107, as illustrated by the communication 151. Within the exemplary system 100 of FIG. 1, the record 133 provided by the administrator is numbered differently than the record 132 received by the administrator to indicate that it is a copy, albeit an equivalent, or even duplicate copy.

Upon receipt of the record 133 from an administrator, according to one aspect, the initial options setup server 107 can assign ownership of the computing device corresponding to such a record 133 to the administrator from whom such a record 133 was received. As illustrated by the corresponding arrow 161, shown in FIG. 1, such an action can entail reference to information stored within the exemplary database 103. For example, the initial options setup server 107 can compare information from the record 133 to information already stored in the database 103. Such compared information can include information identifying the hardware of the computing device to which the record 133 corresponds, such as, for example, one or more of the aforementioned hardware identifiers, or the aforementioned hardware hash, and can further include information identifying the software of the computing device to which the record 133 corresponds, such as, for example, the operating system product key or other like identifier of the copy of the operating system that is installed on that computing device. Because such a comparison can be based on multiple identifiers, namely both hardware identifiers and identifiers of the operating system, an administrator can identify a newly manufactured computing device, or a newly reinitialized computing device, and the earlier point in the setup process, indeed before the setup process has even commenced, which would not have been possible with the same measure of reliability were only a single identifier utilized.

Once the initial options setup server 107 determines which computing device, from among those whose information is stored in the database 103, is identified by the record 133 provided by the administrator, the initial options setup server 107 can assign ownership of such a device to that administrator, such as by including, within the database 103, and associating with the other linked information identifying information of such a computing device, information identifying the administrator. Subsequently, according to one aspect, rather than generating the durable device identifier upon receipt of the record 131, the initial options setup server 107 can trigger the generation of such a durable device identifier upon the receipt of the record 133 from the administrator. More specifically, upon receipt of the record 131, the initial options setup server 107 and still extract the information from the record 131, as detailed above, and associate such information with one another within the database 103, as also detailed above. However, the aforedescribed validation can be delayed until receipt of the record 133 from the administrator. More specifically, upon receipt of the record 133, and the determination of the relevant collection of information within the database 103 identified by the record 133, the initial options set up server 107 can, at that point, perform the aforedescribed validation. As indicated previously, such a validation can include determining that the copy of the operating system uniquely identified by the operating system identifier, such as the operating system product key, within the record 133, is, in fact, a valid, authorized and properly purchased copy of the operating system. As also indicated previously, such a validation can include determining that the copy of the operating system uniquely identified by the operating system identifier is authorized to allow the remote administration of initial setup options. According to such a currently described aspect, the durable device identifier, detailed above, can be generated only if such a validation does, in fact, determined that the copy of the operating system is authorized to allow remote administration of initial setup options.

To remotely administer initial setup options, an administrator can, according to one embodiment, create a profile defining how such options are to be set. For example, the administrator can specify that an individual user need not be presented with an end-user license agreement as part of the setup of the operating system on the computing device. Such an option can be useful if, for example, the entity 101 as a whole has already entered into a contractual relationship such that the end-user license agreement would be redundant, or would otherwise introduce further confusion or delay. As another example, the administrator can specify that a local administrator not be allowed, or, more accurately, that an option, provided by the operating system, to allow local administration of the computing device, be deactivated. As yet another example, the administrator can modify default settings of the operating system established to provide users an easier path through the operating system setup process. Such default settings are often referred to as "express settings" since they require a minimum of user input to be set up in the default manner.

Once a profile, comprising such settings, is created, is graphically represented, in FIG. 1, by the arrow 161, the initial options setup server 107 can enable the administrator to assign the profile to one or more computing devices whose ownership has been assigned to the administrator. For example, the collection of information stored in the database 103 regarding: a particular computing device, such as the computing device identified by the record 133, can be further updated to include a pointer to a specific profile. An administrator can be allowed to change the profile associated with the computing device so long as the administrator is associated with such a computing device in the database 103. According to one aspect, each individual computing device can have a unique profile, while, according to another aspect, a single profile can be simultaneously assigned to multiple computing devices, such as all of the computing devices being utilized by a defined group of the employees of the entity 101. Within the exemplary system 100 shown in FIG. 1, the assigning of a profile to a device, such as by storing a pointer to such a profile within the records associated with such a computing device in the database 103, is illustrated by the arrow 162.

Figure 2:
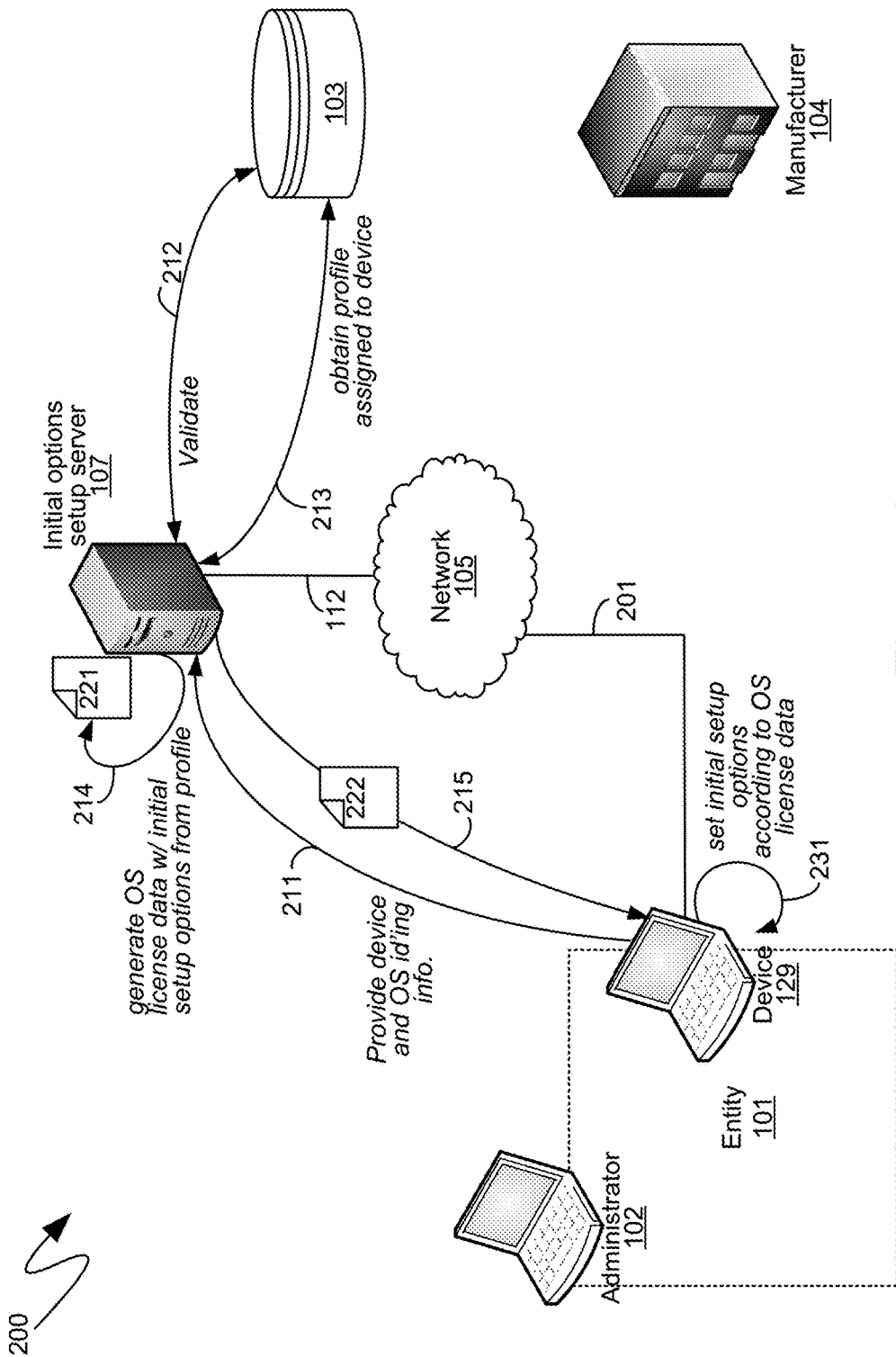
FIG. 2 is a system diagram of another exemplary system for assigning and providing initial install options to a computing device.

Turning to FIG. 2, the exemplary system 200 shown therein illustrates an exemplary series of actions and communications that can complete the remote administration of initial computer operating system setup options. More specifically, when a computing device, such as exemplary computing device 129 referenced above and shown an exemplary system 100 of FIG. 1, is first powered on by a user, such as after it was manufactured, or after it was erased and restored to factory-original condition, a communicational connection 201 between the computing device 129 and the network 105 can be established. Through such a communicational connection, the operating system of the computing device 129 can communicate with one or more server computing devices in order to validate the copy of the operating system being set up on the computing device 129. Typically, such a validation can occur very early in the setup process, since it can be advantageous to detect illegally obtained, or stolen, copies of operating systems prior to allowing the user to have any meaningful access via such an operating system. Consequently, users are often requested to provide networking information, for purposes of establishing a network communication 201 as one of the first options of an operating system that is being set up on a computing device, often immediately after the user has identified a language and keyboard layout, and prior to any other options being set.

According to one aspect, the communication, such as exemplary communication 211 can provide device and operating system identifying information to a server computing device for purposes of validating the copy of the operating system being set up. Such a communication can include, as detailed previously, both identifying information of the copy of the operating system, such as a product key, as well as information identifying the hardware of the computing device 129, such as a hardware hash, or identifiers of individual hardware components of the computing device 129. Upon receipt of such information, a server computing device, such as, for example, the initial options setup server 107, can validate the copy of the operating system identified by the provided information, such as the product key. Additionally, a further validation can determine whether the copy of the operating system is authorized to enable remote administration of initial setup options. Such validation is graphically illustrated within FIG. 2 by the arrow 212, which can reference information stored in the database 103, including information that can have been provided by the operating system creator. Alternatively, although not explicitly shown in FIG. 2, such validation can reference other databases, including databases maintained by, for example, the operating system creator.

If the validation determines that the copy of the operating system identified is a valid copy, a license, such as the exemplary license 221, can be generated and provided to the computing device 129, as the copy of the license 222, as illustrated by the communication 215. As before, the license 222 is assigned a different number to indicate that it is a copy of the license 221, albeit an equivalent or identical copy. If the validation further determines that the copy of the operating system being set up on the computing device 129 is authorized for the remote administration of initial setup options, a further check, graphically illustrated by the arrow 213, can be performed to determine whether such initial setup options have been prespecified by administrator, such as through the specification identification of a profile associated with the computing device 129 in the database 103.

If such initial setup options have been specified in a profile, then the initial options setup server 107 can, as part of the generation of the license 221, illustrated by the arrow 214, include the settings, specified in such a profile, for those initial setup options in the license data 221. Upon receipt of such license data 222, the computing device 129 can set the initial setup options according to the settings specified in the operating system license data 222 that was received, as illustrated by the arrow 231. For example, processes executing on the computing device 129 that validate the operating system installed thereon can do so through the use of software licensing application program interfaces. Such software licensing application program interfaces can include program interfaces that access computer executable instructions that acquire license information, store aspects of license information, and modify software application programs, or the operating system itself, in accordance with licensing data. According to one aspect, therefore, such software licensing application program interfaces can be utilized to set parameters, variables, and other like information to implement the initial setup options as prespecified by the administrator. For example, using such software licensing application program interfaces, a variable can be set that can specify that an end-user license agreement has already been accepted and need not be presented to a user. As another example, using such software licensing application program interfaces, a variable defining whether or not local administration of the computing devices allowed can be set to a value commensurate with the disallowance of such local administration. As yet another example, one or more variables associated with express settings of the operating system can be changed to conform to the settings previously selected by the administrator and encapsulated within the license data 222. Once such initial setup options have been set, as previously dictated by the administrator, the user of the computing device 129 can be provided with a login screen, or other like interface, through which the user can log in to a directory service and further setup of the computing device can proceed in a traditional manner.

Figure 3:
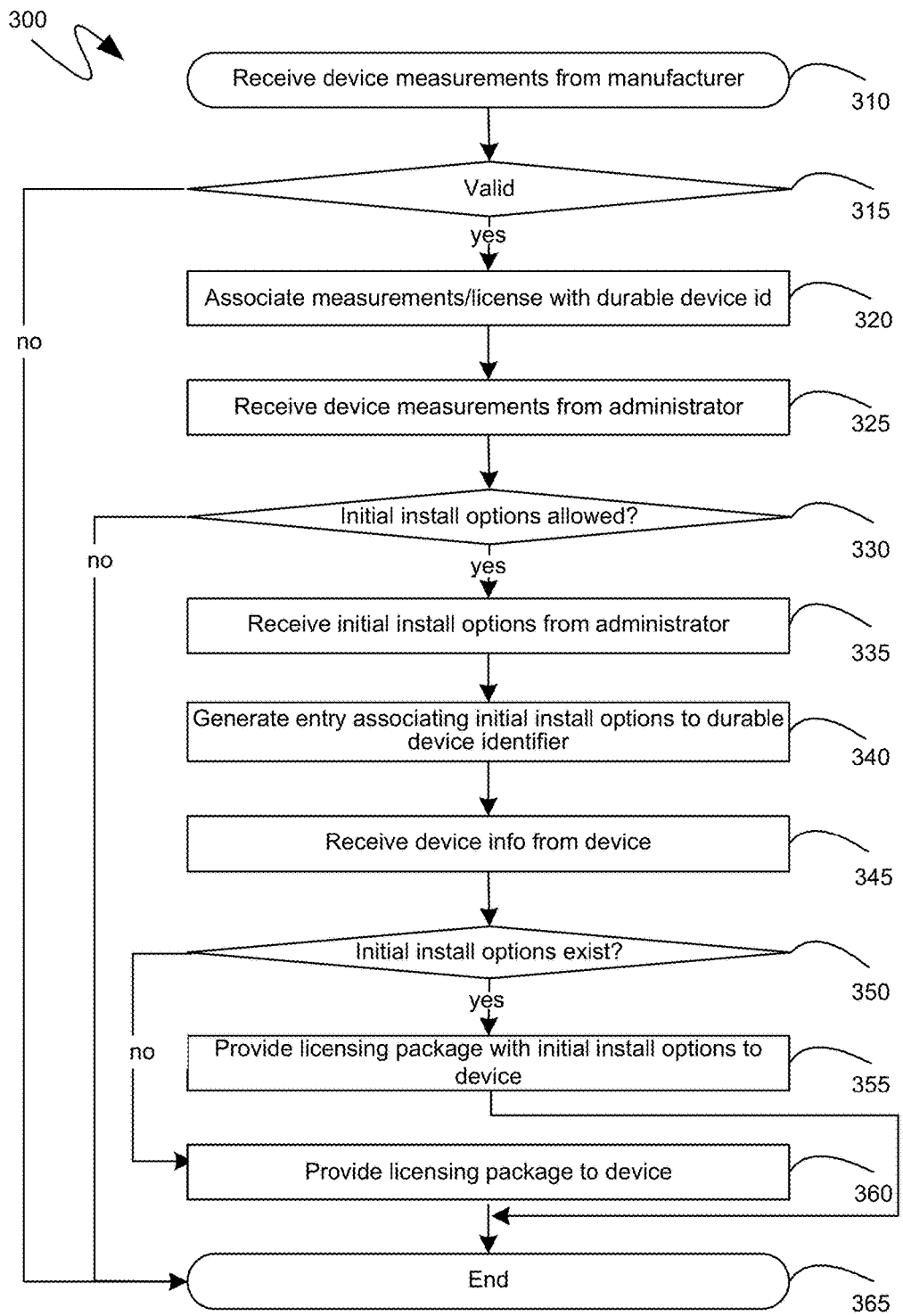
FIG. 3 is a flow diagram of an exemplary series of steps by which initial install options can be provided to a device.

Turning to FIG. 3, the flow diagram 300 shown therein illustrates an exemplary series of steps that can be performed by one or more server computing devices facilitating the remote administration of initial computer operating system setup options. Initially, at step 310, device information can be received, such as from a manufacturer of the computing device. As indicated previously, such device information can include identifying information of both hardware aspects of such a computing device, as well as identifying information of software installed in the computing device, such as a copy of an operating system installed on the computing device. At step 315, a validation can be performed to determine whether the copy of the operating system installed on the computing device is valid. If such a validation, at step 315 fails, the relevant processing can end at step 365, as illustrated in FIG. 3. Conversely, if, in step 315, the operating system copy of the operating system installed on computing devices determined to be invalid, processing can proceed to step 320, at which point various measurements or other identifiers can be extracted from the record received at step 310 and can be associated with one another. Additionally, as detailed above, a durable device identifier can be generated and also associated with such extracted information.

At step 325, an administrator can seek to claim ownership of the device, for purposes of remotely administering initial setup options, by providing information, including hardware identifying information and software defined information, such as would have been provided to such an administrator in a computer record. Subsequently, at step 330, upon receipt of such information from an administrator at step 325, a validation can be performed to determine whether the remote administration of initial set of options is allowed, or authorized, for the copy of the operating system installed on the computing device, as identified by the information received from the administrator at step 325. Again, if the validation, at step 330, fails, the relevant processing can and at step 365. Conversely, if the validation at step 330 succeeds, processing and proceed to step 335 and the settings for the initial install options can be received from the administrator. Subsequently, at step 340, an association can be generated between the previously associated aspects of the computing device, including hardware identifiers, software identifies, in the aforementioned durable device identifier, into the settings for the initial install options that were received at step 335.

At step 345, as part of the setup of the operating system on the computing device, identifying information can be received, such as to validate the copy of the operating system installed on the computing device and obtain a license therefore. As part of the validation of the copy of the operating system, based on the information received from the computing device at step 345, a check can be performed, such as at step 350, as to whether the copy of the operating system is authorized to enable the remote administration of initial setup options, and whether such initial setup options have, in fact, been set. If, at step 350, is determined that such remote administration is not authorized, or that such initial setup options have not been set, processing can proceed to step 360, and a license for the operating system can be provided to the device. The relevant processing can then end at step 365. Conversely, if at step 350, it is determined that remote administration is authorized in that initial setup options have been sent, processing can proceed to step 355, and operate system licensing information can be generated that includes not only a license for the operating system, but also the settings of the initial setup options as prespecified by an administrator. Such a licensing package can be provided to the computing device, at step 355, and the relevant processing can then and at step 365.

Figure 4:
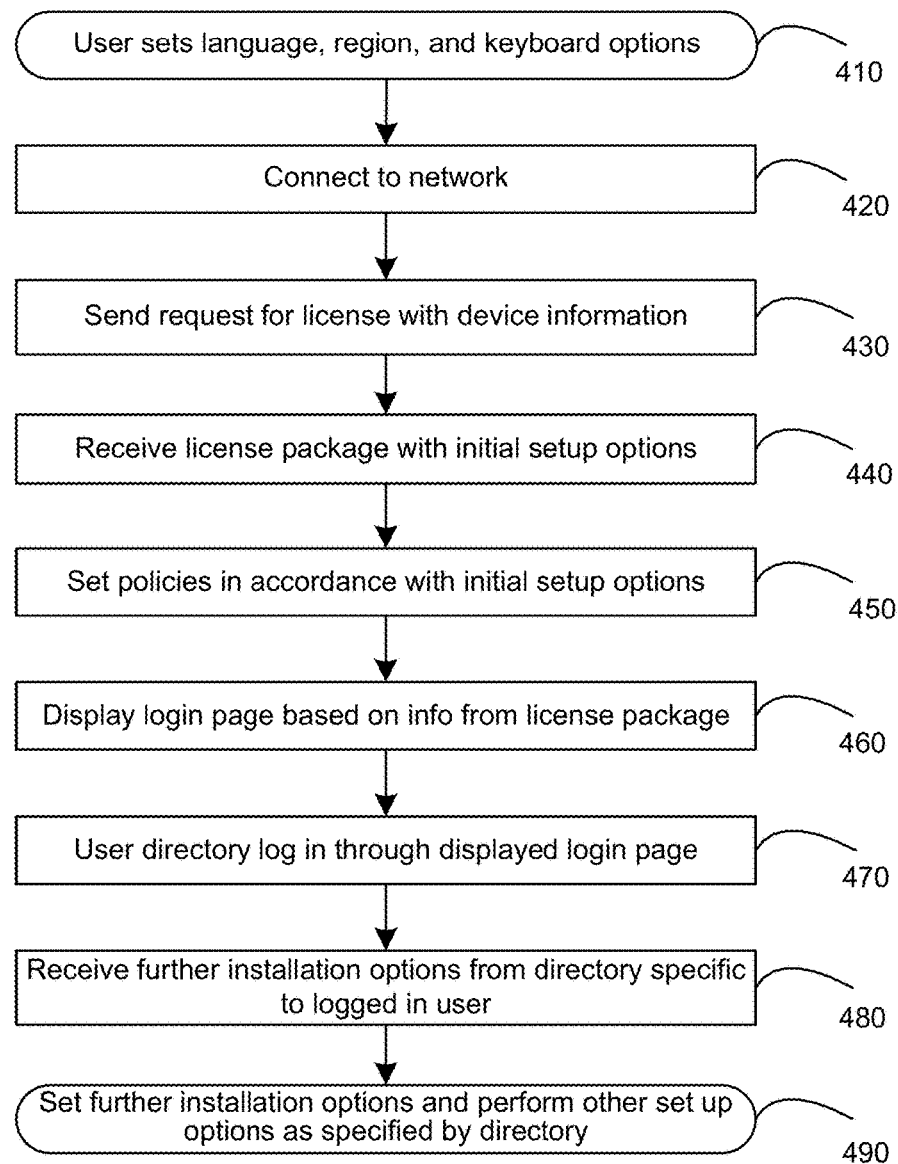
FIG. 4 is a flow diagram of an exemplary series of steps by which initial install options can be set on a computing device.

Turning to FIG. 4, the exemplary flow diagram 400 shown therein illustrates an exemplary series of steps by which initial setup options can be remotely administered and automatically set without requiring the user to manually set them. Initially, at step 410, as part of an initial setup of an operating system on a computing device, such as a computing device that is being powered on for the first time after manufacture, or a computing device that is being powered on after being erased and restored to manufactured condition, a user can be prompted to set certain options that can be required for the computing device to meaningfully interact with the user including, for example, which human language the computing device is to utilize in its user interface, the geographic region within which the computing device is being set up, and which keyboard options are to define the receipt of user input through a keyboard communicationally coupled to the computing device. Subsequently, at step 420, the computing device can be communicationally coupled to a network, such as to enable the computing device to obtain a license for the operating system. At step 430, information regarding the computing device, and the operating system being set up thereon, can be provided as part of the request to receive such a license. As indicated previously, such information can include information identifying the copy of the operating system, such as a product key, as well as information identifying the hardware of the computing device, such as a hardware hash, or identifiers of individual hardware components of the computing device.

Subsequently, at step 440, in response to the request from step 430, a license package can be received comprising a license for the copy of the operating system being set up on the computing device. According to one aspect, the license data received at step 440 can include preselected settings for initial setup options. At step 450, such initial setup options can be set on the computing device. As detailed previously, according to one aspect, software licensing application program interfaces can be accessed by the computer executable instructions performing the steps of the exemplary flow diagram 400 of FIG. 4, and through such software licensing application program interfaces, variables, parameters, or other like data structures can have their values modified, or initialized, in order to establish the initial setup options in the manner specified by the license package received at step 440.

The setup of the computing device can then continue at step 460, whereupon a user can be provided with an interface through which the user can log into a directory service. According to one aspect, such an interface can have been one of the initial setup options that can have been specified as part of the data received the license at step 440. Thus, for example, an administrator of an entity can choose to present an entity-specific login page, such as a login page comprising the entities name, logo, color scheme, or other like visual accoutrements. At step 470, the user can provide their user credentials and identify themselves in an authenticated manner, through such a login page, to the directory service. Additional installation or setup options can then be received from the directory service at step 480, and the computing device can be so set up at step 490. More specifically, and is will be recognized by those skilled in the art, such directory services provided the traditional mechanisms by which various options and settings on a computing device can be remotely administer, and one or more software application packages can be remotely installed on the computing device in order to, for example, provide homogeneity among the computing devices being supported by the administrator, namely the computing devices associated with the entity on whose behalf the administrator is administering the computing devices. However, as can be seen from the exemplary flow diagram 400 of FIG. 4, certain options can be required by the operating system to be set prior to the user's log into such a directory service and, as such, but for the mechanisms described herein, such options were not able to be remotely administered because they were already set at the time that a first communication with the directory service was established. Consequently, the mechanisms described herein provide for the remote administration of initial operating system setup options, namely those options that are sent prior to directory sign in or other analogous communicational couplings.

Figure 5:
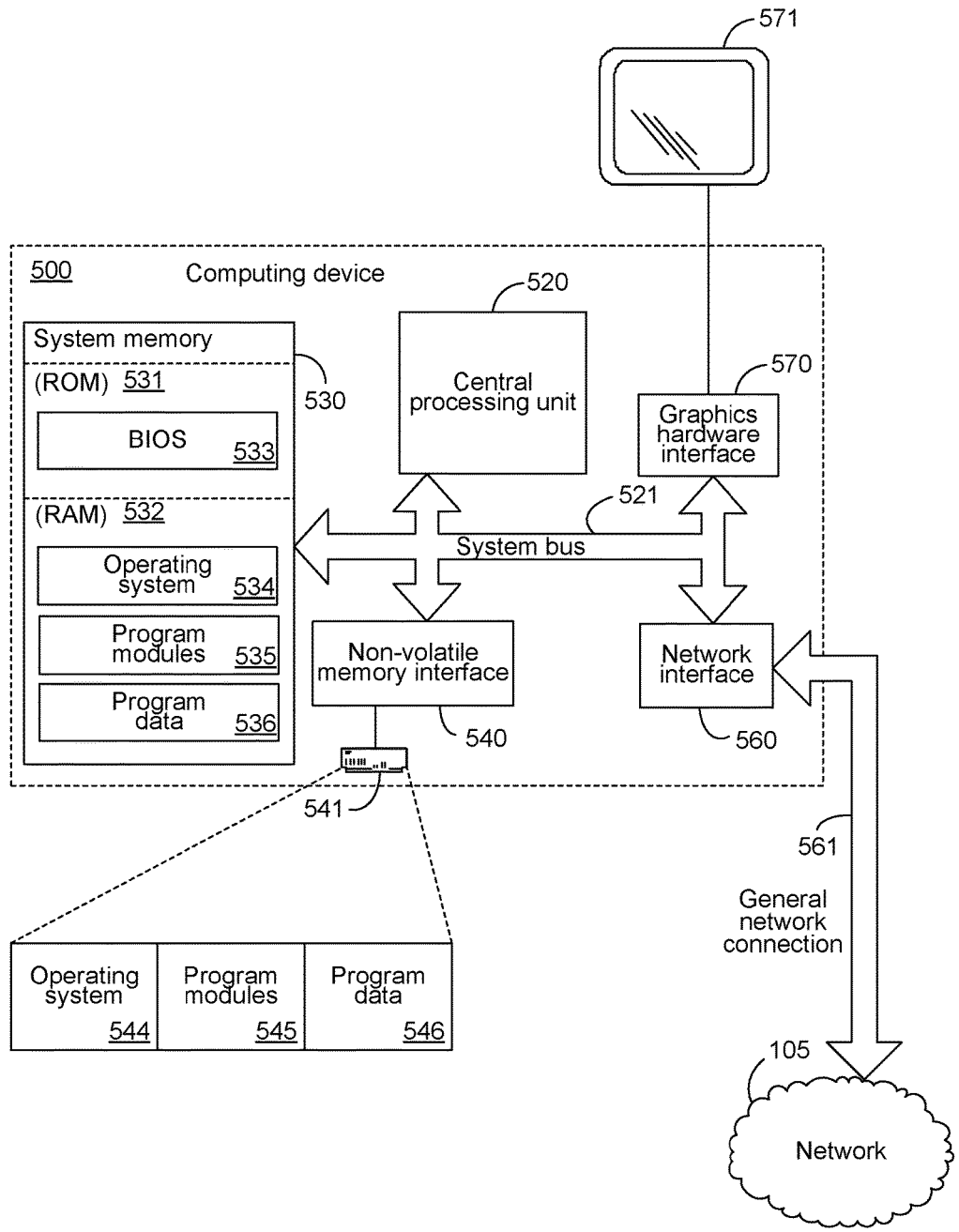
FIG. 5 is a block diagram of an exemplary computing device.

Turning to FIG. 5, an exemplary computing device 500 is illustrated which can perform some or all of the mechanisms and actions described above. The exemplary computing device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, including, but not limited to, a graphics hardware interface 570 and a display device 571, which can include display devices capable of receiving touch-based user input, such as a touch-sensitive, or multi-touch capable, display device. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 500. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer content between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The computing device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 636. Operating system 544, other program modules 545 and program data 546 are given different numbers hereto illustrate that, at a minimum, they are different copies.

The computing device 500 may operate in a networked environment using logical connections to one or more remote computers. The computing device 500 is illustrated as being connected to the general network connection 561 through a network interface or adapter 560, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

Although described as a single physical device, the exemplary computing device 500 can be a virtual computing device, in which case the functionality of the above-described physical components, such as the CPU 520, the system memory 530, the network interface 560, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example is a computing device comprising: one or more processing units; a network interface; a graphics hardware interface; and one or more computer-readable media comprising computer-executable instructions which, when executed by the one or more processing units, cause the computing device to: locally obtain device-identifying information; receive, through the network interface, operating system license data based on the obtained device-identifying information, the received operating system license data comprising both a license for an operating system to be set up on the computing device and initial operating system setup options; automatically set operating system options in accordance with the received initial operating system setup options; present, through the graphics hardware interface, a customized directory sign-in that was specified by the received initial operating system setup options; and complete setting up the operating system in accordance with subsequent operating system setup options received based on user identifying information provided through the customized directory sign-in.

A second example is the computing device of the first example, wherein the computer-executable instructions causing the computing device to obtain the device-identifying information comprise computer-executable instructions, which, when executed by the one or more processing units cause the computing device to obtain at least one of: a MAC address of the network interface, a BIOS identifier, or a cryptographic certificate of a Trusted Platform Module (TPM) of the computing device.

A third example is the computing device of the first example, wherein the computer-executable instructions causing the computing device to obtain the device-identifying information comprise computer-executable instructions, which, when executed by the one or more processing units cause the computing device to generate a single hardware hash value that incorporates two or more identifiers assigned to hardware components of the computing device.

A fourth example is the computing device of the first example, wherein the computer-executable instructions causing the computing device to automatically set the operating system options comprise computer-executable instructions which, when executed by the one or more processing units, set the operating system options through one or more software licensing Application Program Interfaces (APIs).

A fifth example is the computing device of the first example, wherein the operating system license data further comprises a license that authorizes the automatic setting of the operating system options in accordance with the received initial operating system setup options.

A sixth example is the method, of automatically setting initial setup options for an operating system, the method comprising: receiving a computing device record comprising both hardware-identifying information of a computing device and operating system software-identifying information of a copy of the operating system that is to be set up on the computing device; subsequently associating the computing device and its copy of the operating system with an entity based on a subsequent receipt of the computing device record in conjunction with an identification of the entity; validating the copy of the operating system based on the operating system software-identifying information, the validating comprising determining that the automatic setting of the initial setup options is authorized for the copy of the operating system; receiving a profile comprising settings for the initial setup options; associating the received profile with the computing device and its copy of the operating system if the validating determined that the automatic setting of the initial setup options is authorized for the copy of the operating system; generating operating system license data comprising both a license that authorizes the automatic setting of the initial setup options and the initial setup options that were specified in the received profile; and providing the operating system license data to the computing device in response to a request containing the hardware-identifying information.

A seventh example is the method of the sixth example, wherein the receiving the computing device record comprises receiving a computer build record from a manufacturer of the computing device.

An eighth example is the method of the sixth example, wherein the hardware-identifying information comprises at least one of: MAC address of the network interface, a BIOS identifier, or a cryptographic certificate of a Trusted Platform Module (TPM) of the computing device.

A ninth example is the method of the eighth example, further comprising generating a single hardware hash value that incorporates two or more identifiers assigned to hardware components of the computing device.

A tenth example is the method of the sixth example, wherein the hardware-identifying information comprises a single hardware hash value incorporating two or more identifiers assigned to hardware components of the computing device.

An eleventh example is the method of the sixth example, wherein the subsequent receipt of the computing device record is from an administrator of the entity; and wherein further the receiving the profile is also from the administrator of the entity.

A twelfth example is the method of the sixth example, further comprising requesting the generation of a durable device identifier for the computing device and the copy of the operating system from at least one of the hardware-identifying information or the operating system software-identifying information, the durable device identifier continuing to uniquely identify the computing device after upgrades to hardware components of the computing device.

A thirteenth example is the method of the sixth example, further comprising associating the same received profile with multiple other computing devices.

A fourteenth example is the method of the sixth example, wherein a setting for an initial setup option specified in the profile comprises disallowing a local administration of the computing device.

A fifteenth example is the method of the sixth example, wherein a setting for an initial setup option specified in the profile comprises skipping presentation of an end-user license agreement associated with the operating system.

A sixteenth example is the method of the sixth example wherein a setting for an initial setup option specified in the profile comprises a customized directory sign-in that is specific to the entity.

A seventeenth example is a computing device configured to perform steps comprising: locally obtaining hardware-identifying information of the computing device; receiving, through the network interface, operating system license data based on the obtained hardware-identifying information, the received operating system license data comprising both a license for an operating system to be set up on the computing device and initial operating system setup options; and automatically setting operating system options in accordance with the received initial operating system setup options; and the one or more server computing devices configured to perform steps comprising: receiving a computing device record comprising both the hardware-identifying information and operating system software-identifying information of a copy of the operating system that is to be set up on the computing device; subsequently associating the computing device and its copy of the operating system with an entity based on a subsequent receipt of the computing device record in conjunction with an identification of the entity; validating the copy of the operating system based on the operating system software-identifying information, the validating comprising determining that the automatic setting of the initial setup options is authorized for the copy of the operating system; receiving a profile comprising settings for the initial setup options; associating the received profile with the computing device and its copy of the operating system if the validating determined that the automatic setting of the initial setup options is authorized for the copy of the operating system; generating operating system license data comprising both a license that authorizes the automatic setting of the initial setup options and the initial setup options that were specified in the received profile; and providing the operating system license data to the computing device in response to a request containing the hardware-identifying information.

An eighteenth example is the system of the seventeenth claim, wherein the computing device is further configured to set the operating system options through one or more software licensing Application Program Interfaces (APIs).

A nineteenth example is the system of the seventeenth claim, wherein the one or more server computing devices are further configured to receive the computing device record as a computer build record from a manufacturer of the computing device; and are further configured to subsequently receive the computing device record from an administrator of the entity.

A twentieth example is the system of the seventeenth example, wherein the one or more server computing devices are further configured to associate the same received profile with multiple other computing devices.

As can be seen from the above descriptions, mechanisms for remotely administering setting initial setup options for a computer operating system have been presented. In view of the many possible variations of the subject matter described herein, we claim as our invention all such embodiments as may come within the scope of the following claims and equivalents thereto.

We claim:

1. A method of automatically setting initial setup options for an operating system, the method comprising:
    receiving a computing device record comprising both hardware-identifying information of a computing device and operating system software-identifying information of a copy of the operating system that is to be set up on the computing device;
    subsequently associating the computing device and its copy of the operating system with an entity based on a subsequent receipt of the computing device record in conjunction with an identification of the entity;
    validating the copy of the operating system based on the operating system software-identifying information, the validating comprising determining that the automatic setting of the initial setup options is authorized for the copy of the operating system;
    receiving a profile comprising settings for the initial setup options;
    associating the received profile with the computing device and its copy of the operating system if the validating determined that the automatic setting of the initial setup options is authorized for the copy of the operating system;
    generating operating system license data comprising both a license that authorizes the automatic setting of the initial setup options and the initial setup options that were specified in the received profile; and
    providing the operating system license data to the computing device in response to a request containing the hardware-identifying information.

2. The method of claim 1, wherein the receiving the computing device record comprises receiving a computer build record from a manufacturer of the computing device.

3. The method of claim 1, wherein the hardware-identifying information comprises at least one of: MAC address of the network interface, a BIOS identifier, or a cryptographic certificate of a Trusted Platform Module (TPM) of the computing device.

4. The method of claim 3, further comprising generating a single hardware hash value that incorporates two or more identifiers assigned to hardware components of the computing device.

5. The method of claim 1, wherein the hardware-identifying information comprises a single hardware hash value incorporating two or more identifiers assigned to hardware components of the computing device.

6. The method of claim 1, wherein the subsequent receipt of the computing device record is from an administrator of the entity; and wherein further the receiving the profile is also from the administrator of the entity.

7. The method of claim 1, further comprising requesting the generation of a durable device identifier for the computing device and the copy of the operating system from at least one of the hardware-identifying information or the operating system software-identifying information, the durable device identifier continuing to uniquely identify the computing device after upgrades to hardware components of the computing device.

8. The method of claim 1, further comprising associating the same received profile with multiple other computing devices.

9. The method of claim 1, wherein a setting for an initial setup option specified in the profile comprises disallowing a local administration of the computing device.

10. The method of claim 1, wherein a setting for an initial setup option specified in the profile comprises skipping presentation of an end-user license agreement associated with the operating system.

11. The method of claim 1, wherein a setting for an initial setup option specified in the profile comprises a customized directory sign-in that is specific to the entity.

12. A system comprising:
    a computing device configured to perform steps comprising:
        locally obtaining hardware-identifying information of the computing device;
        receiving, through a network interface of the computing device, operating system license data based on the obtained hardware-identifying information, the received operating system license data comprising both a license for an operating system to be set up on the computing device and initial setup options for the operating system; and
        automatically setting operating system options in accordance with the received initial setup options; and
    the one or more server computing devices configured to perform steps comprising:
        receiving a computing device record comprising both the hardware-identifying information and operating system software-identifying information of a copy of the operating system that is to be set up on the computing device;
        subsequently associating the computing device and its copy of the operating system with an entity based on a subsequent receipt of the computing device record in conjunction with an identification of the entity;
        validating the copy of the operating system based on the operating system software-identifying information, the validating comprising determining that the automatic setting of the initial setup options is authorized for the copy of the operating system;

receiving a profile comprising settings for the initial setup options;

associating the received profile with the computing device and its copy of the operating system if the validating determined that the automatic setting of the initial setup options is authorized for the copy of the operating system;

generating the operating system license data comprising both the license, authorizing the automatic setting of the initial setup options and the initial setup options that were specified in the received profile; and providing the operating system license data to the computing device in response to a request containing the hardware-identifying information.

13. The system of claim 12, wherein the computing device is further configured to set the operating system options through one or more software licensing Application Program Interfaces (APIs).

14. The system of claim 12, wherein the one or more server computing devices are further configured to receive the computing device record as a computer build record from a manufacturer of the computing device; and are further configured to subsequently receive the computing device record from an administrator of the entity.

15. The system of claim 12, wherein the one or more server computing devices are further configured to associate the same received profile with multiple other computing devices.

16. The system of claim 12, wherein the computing device is further configured to perform additional steps comprising:

presenting, through a graphics hardware interface of the computing device, a customized directory sign-in that was specified by the received initial operating system setup options; and completing setting up the operating system in accordance with subsequent operating system setup options received based on user identifying information provided through the customized directory sign-in.

17. The system of claim 12, wherein the step of locally obtaining the hardware-identifying information of the computing device comprises generating, by the computing device, a single hardware hash value that incorporates two or more identifiers assigned to hardware components of the computing device.

18. The system of claim 12, wherein the one or more server computing devices are further configured to request the generation of a durable device identifier for the computing device and the copy of the operating system from at least one of the hardware-identifying information or the operating system software-identifying information, the durable device identifier continuing to uniquely identify the computing device after upgrades to hardware components of the computing device.

19. The system of claim 12, wherein the one or more server computing devices are further configured to associate the same received profile with multiple other computing devices.

20. The system of claim 12, wherein a setting for an initial setup option specified in the profile comprises disallowing a local administration of the computing device.

* * * * *